United States Patent Office 3,362,779
Patented Jan. 9, 1968

3,362,779
PROCESS FOR DYEING, PRINTING AND PAINTING POLYACETAL RESINS
Hans-Joachim Lenz, Lorsbach, Taunus, and Hans-Peter Maier, Sulzbach, Taunus, Germany, assignors to Farbwerke Hoechst Aktiengesellschaft vormals Meister Lucius & Brüning, Frankfurt am Main, Germany, a corporation of Germany
No Drawing. Filed Oct. 29, 1964, Ser. No. 407,576
Claims priority, application Germany, Nov. 2, 1963, F 41,179
1 Claim. (Cl. 8—4)

The present invention relates to a process for dyeing, printing and painting polyacetal resins.

By polyacetal resins there are to be understood polymers containing the following structural units

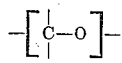

wherein preferably two hydrogen atoms or one hydrogen atom and one alkyl group, which may be substituted, are bound to the carbon atom. Macromolecular polyacetals can be prepared according to known processes by anionic or cationic polymerization. The term "polyacetal resins" includes copolymers of aldehydes and cyclic acetals with cyclic formals or cyclic ethers and other polymers which are polymerizable according to an ionic polymerization rhythm. As polyacetals there are primarily suitable high molecular weight polyoxymethylene or copolymers of formaldehyde or trioxane and cyclic ethers of the formula

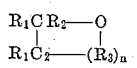

wherein $R_1$ and $R_2$ represent H or a lower alkyl group or a lower halogen-substituted alkyl group, and $R_3$ represents a methylene- or oxymethylene group, a lower alkyl- or halogenalkyl-substituted methylene group, or a lower alkyl- or halogenalkyl-substituted oxymethylene group, and $n$ represents a whole number from 0 to 3. There are preferably used cyclic ethers such as, for example, diglycol formals, dioxolanes, butanediol-formals, tetrahydrofuran, or ethylene oxide. There are generally used copolymers prepared from 90 to 99% by weight of trioxane and 10 to 1% by weight of cyclic ethers.

To prepare dyed shaped articles from these polyacetal resins, it was hitherto usual to dye the polymer in the mass by admixing pigments prior to the molding process. Such a pigmenting, however, can only be carried out in an economic manner when larger quantities of the polymer resin have to be dyed the same shade. In the case of small batches having different shades as required, for example, in the manufacture of buttons or other small articles, it is more suitable to dye the shaped articles subsequently.

Now it has proved to be extraordinarily difficult subsequently to dye shaped articles made of polyacetal resins. With most dyestuffs a special pretreatment of the material is necessary. Moreover, the dyeings so obtained rarely possess a sufficient fastness to light, and there are generally obtained spotty dyeings which have an insufficient fastness to rubbing. It was found that only dispersion dyestuffs have a good affinity for polyacetal resins. All other dyestuffs, for example vat dyestuffs, substantive dyestuffs, reactive dyestuffs and acid dyestuffs do not have a sufficient affinity for polyacetal resins. Dispersion dyestuffs, on the contrary, are so rapidly absorbed that the polymer is dyed intensely in a few seconds. In this case, however, uniform dyeings which are fast to rubbing cannot be obtained with the usual methods owing to this high speed of absorption.

Now we have found that shaped structures of polyacetal resins can be dyed, printed and painted with dispersion dyestuffs in a uniform manner while imparting to them fastness to rubbing, when dyestuff prepartions are applied to the shaped structures which contain, in addition to the dispersion dyestuffs, non-ionogenic surface-active compounds and, preferably, also anionic surface-active compounds.

The dyestuff preparations may be aqueous dyebaths or pastes containing, if necessary, thickening agents which, for printing or painting, may also be used in the anhydrous form.

In the dyeing process according to the present invention, there are suitably employed dyeing periods of about 1 to 5 minutes when working according to the continuous dyeing process, and periods of about 2 to about 20 minutes when working according to the exhaust process, at temperatures ranging from about 90° to 105° C., the ratio of goods to liquor being about 1:10 to 1:30. In the printing or painting process, the dyestuff is fixed by a subsequent heating to temperatures within the range of from about 100° to 160° C., preferably 140° to 160° C., during the course of about 1 to 30 minutes. The temperature and duration of the fixation can vary according to the intensity of the dyeing and the wall thickness of the shaped articles.

By the addition of the surface-active auxiliary agents, the absorption speed of the dispersion dyestuffs is apparently controlled and the formation of deposits of the dispersion dyestuffs on the surface of the material avoided, which deposits would result in a poor fastness to rubbing and impart to the dyeing an unsettled and spotty appearance.

As non-ionogenic surface-active compounds there may be used addition products of alkylene oxides, preferably ethylene oxide and/or propylene oxide, and vegetable or animal oils and fats or high molecular weight aliphatic carboxylic acids and aliphatic or aromatic hydroxyl compounds containing about 8 to 20 carbon atoms, such as aliphatic alcohols or alkyl phenols. There are generally used products obtained by reacting 1 mole of the aliphatic or aromatic compounds with about 4 to 40 moles of ethylene oxide and/or propylene oxide. The amount of the non-ionogenic surface-active compound to be added to the dyestuff preparations can vary within wide limits. In the dyeing process, generally 0.2 to 3 grams, preferably 0.3 to 1 gram, are used per liter of the dyebath, while in the printing or painting process generally about 5 to 50 grams are used per kilogram of the printing paste.

As surface-active anionic compounds there may be used alkyl-aryl sulfonates or sulfating products of oils, high molecular weight carboxylic acids or alcohols. In the case of the alkyl-aryl sulfonates, the alkyl groups may contain about 3 to 18 carbon atoms. There are preferably used sulfonates of alkyl naphthalene, for example of mono- and diisopropyl naphthalene, or dibutyl naphthalene. In the dyeing process the anionic auxiliary agents are applied in an amount within the range of from 0.2 to 3, preferably 0.3 to 1 gram per liter of the dyebath. In the printing or painting process there are generally applied substantially higher amounts of the order of about 100 to 600 grams per kilogram of the printing paste. As anionic auxiliary agents there are preferably used sulfonated oils or fats, for example Turkey-red oil, which simultaneously act as pasting agents for the dispersion dyestuffs. In the printing or painting process the dispersion dyestuff is applied together with the non-ionogenic and anionic auxiliary agents, preferably without the addition of water. As dispersion dyestuffs there are used the dyestuffs well known for the dyeing of cellulose acetate and polyester fibers, preferably the dyestuffs from the variety of the azo dyestuffs such as, for example, monoazo-, aminoazo-, disazo dyestuffs and esterified azo dyestuffs, amino anthraquinone dyestuffs and the halogenated derivatives thereof, amino-hydroxy-anthraquinone dyestuffs and the corresponding phenyl ethers, furthermore disazo compounds coupled on substituted anilides of β-hydroxy-naphthoic acid, disazo compounds coupled on heterocycles and heterocycles with condensed aromatics.

The following examples serve to illustrate the invention but they are not intended to limit it thereto, the parts being by weight:

*Example 1*

Buttons of polyacetal resin, obtained by polymerizing 98 parts trioxane with 2 parts ethylene oxide according to the process described in U.S. patent application S.N. 152,666, filed on Nov. 15, 1961 in the name of Klaus Kullmar et al. for "Copolymers of Cyclic Acetals With Oxacyclopropane or Oxacyclobutane or the Derivatives Thereof and Process for Preparing Said Copolymers," now U.S. Patent No. 3,219,631, were dyed at a goods-to-liquor ratio of 1:20 in a bath containing per liter 10 grams of the red dispersion dyestuff, prepared by coupling p-aminobenzaldehyde oxime on 2,3-hydroxy-napthoic-acid-p-anisidine, 1 gram sodium sulfonate of dibutyl naphthalene and 0.5 gram of an addition compound of 36 moles ethylene oxide and 1 mole caster oil and, for the purpose of stabilization, 0.5 gram calcium phenyl kogasin sulfonate. The material to be dyed was first placed in the cold dyebath, then the bath was heated to the boiling temperature and the dyeing process was continued for 15 minutes at the boiling temperature. The material was rinsed several times with warm and cold water, while 1 gram of an addition compound of 36 moles ethylene oxide and 1 mole castor oil was added per liter of the first warm rinsing bath. Red dyeings of high intensity were obtained which had a good fastness to washing, rubbing and to light.

To prepare the dye bath, the dyestuff and the aforesaid auxiliary agents were first stirred into a paste with a small amount of soft water at 40° to 50° C., then 15 times the amount thereof of soft water was poured on to the paste and the dyestuff dispersions thus obtained were added thru a fine-meshed screen to the dyebath consisting of cold soft water.

*Example 2*

43.4 parts of the dyestuff 1,8-amino-4,6-hydroxy-anthraquinone were ground to a paste on a 3-rollermill with 50 parts of Turkey-red oil and 3.3 parts of an addition compound of 36 moles ethylene oxide and 1 mole caster oil and 3.3 parts of an addition compound of 10 moles ethylene oxide and 1 mole nonyl phenol. Bottles of a polyacetal resin as described in Example 1, were printed with this paste according to the screen printing process. Then the bottles were subjected to an after-treatment in a warming cabinet at 140° C. for 5 to 10 minutes, depending on the wall thickness of the bottles. After cooling the bottles were washed with water. There were obtained prints of high intensity that were resistant to migration and possessed a good fastness to rubbing, light and washing.

*Example 3*

43.4 parts of the dyestuff 1-amino-2-methoxy-4-hydroxy-anthraquinone were ground on a roller mill with 50 parts of Turkey-red oil, 3.3 parts of an addition compound of 36 moles ethylene oxide and 1 mole castor oil and 3.3 parts of the addition compound of 10 moles ethylene oxide and 1 mole nonyl phenol. With the printing paste so obtained shaped articles of a polyacetal resin as described in Example 1, were printed according to the dry offset printing process. The prints were then heated to 140° C. for 5 to 10 minutes depending on the wall thickness of the shaped article. After cooling the shaped articles were washed with water. Prints of a high intensity were obtained which had a good fastness to washing, light and rubbing.

We claim:
1. A process for dyeing, printing or painting a shaped polyacetal resin with a dispersion dyestuff, which comprises applying to said shaped resin a dyebath or printing paste containing a mixture of non-ionic and anionic surface-active compounds.

References Cited

UNITED STATES PATENTS

| 2,923,591 | 2/1960 | Reiser. | |
| 3,134,636 | 5/1964 | Singleton | 8—55 |
| 2,914,373 | 11/1959 | Rieser | 8—4 |
| 3,186,788 | 6/1965 | Mills et al. | 8—55 |
| 3,203,750 | 8/1965 | Carbonell et al. | 8—4 |

J. TRAVIS BROWN, *Acting Primary Examiner.*

NORMAN G. TORCHIN, *Examiner.*

T. J. HERBERT, *Assistant Examiner.*